US012580941B2

(12) United States Patent
Zhou et al.

(10) Patent No.: US 12,580,941 B2
(45) Date of Patent: Mar. 17, 2026

(54) RISK EVALUATION FOR A VULNERABILITY ASSESSMENT SYSTEM ON A DATA COMMUNICATION NETWORK FROM A COLLECTION OF THREATS

(71) Applicant: Fortinet, Inc., Sunnyvale, CA (US)

(72) Inventors: Chenchen Zhou, Sunnyvale, CA (US); Dancheng Sun, Sunnyvale, CA (US)

(73) Assignee: Fortinet, Inc., Sunnyvale, CA (US)

( * ) Notice: Subject to any disclaimer, the term of this patent is extended or adjusted under 35 U.S.C. 154(b) by 75 days.

(21) Appl. No.: 18/142,841

(22) Filed: May 3, 2023

(65) Prior Publication Data

US 2024/0372884 A1 Nov. 7, 2024

(51) Int. Cl.
*H04L 9/40* (2022.01)

(52) U.S. Cl.
CPC .................................. *H04L 63/1433* (2013.01)

(58) Field of Classification Search
CPC .................................................... H04L 63/1433
USPC ............................................................ 726/25
See application file for complete search history.

(56) References Cited

U.S. PATENT DOCUMENTS 8,544,098 B2 * 9/2013 Gustave ................ G06F 21/577
709/224
2005/0005169 A1 * 1/2005 Kelekar .................. G06F 9/542
726/4

| | | | | |
|---|---|---|---|---|
| 2012/0185945 A1 * | 7/2012 | Andres | ................. | G06F 21/568 |
| | | | | 726/25 |
| 2013/0312101 A1 * | 11/2013 | Lotem | ..................... | G06F 21/55 |
| | | | | 726/25 |
| 2015/0244734 A1 * | 8/2015 | Olson | ................... | G06F 21/577 |
| | | | | 726/25 |
| 2017/0286690 A1 * | 10/2017 | Chari | .................... | G06F 21/577 |
| 2018/0351987 A1 * | 12/2018 | Patel | .................... | G06F 21/577 |
| 2020/0012796 A1 * | 1/2020 | Trepagnier | ............ | G06F 18/254 |
| 2020/0296127 A1 * | 9/2020 | Mylavarapu | ........ | H04L 63/1441 |
| 2021/0211450 A1 * | 7/2021 | Aleidan | ............. | H04L 63/1416 |
| 2021/0390174 A1 * | 12/2021 | Rosendahl | .............. | G06F 21/53 |
| 2022/0156383 A1 * | 5/2022 | Schwarzbauer | ...... | G06F 21/566 |
| 2024/0106826 A1 * | 3/2024 | Ravichandran | ....... | G06F 21/577 |

OTHER PUBLICATIONS

NPL Search Terms (Year: 2025).*

* cited by examiner

*Primary Examiner* — Syed A Zaidi
(74) *Attorney, Agent, or Firm* — Law Office of Dorian Cartwright; Dorian Cartwright

(57) ABSTRACT

A private network is scanned to identify devices, and profiling identified devices for vulnerabilities. A score is determined from a Common Vulnerability Scoring System (CVSS) database for each vulnerability individually that characterizes severity. A score is determined for a collection of vulnerabilities. Exponential tapering functions curb an influence of large numbers of low priority threats on the collection score. The collection threat score increases with severity of the collection of vulnerabilities.

20 Claims, 6 Drawing Sheets

Vulnerability
Assessment Device
105

Device Scanning
Module
210

CVSS Module
220

Aggregate Threat
Engine
230

Security Action
Module
240

100

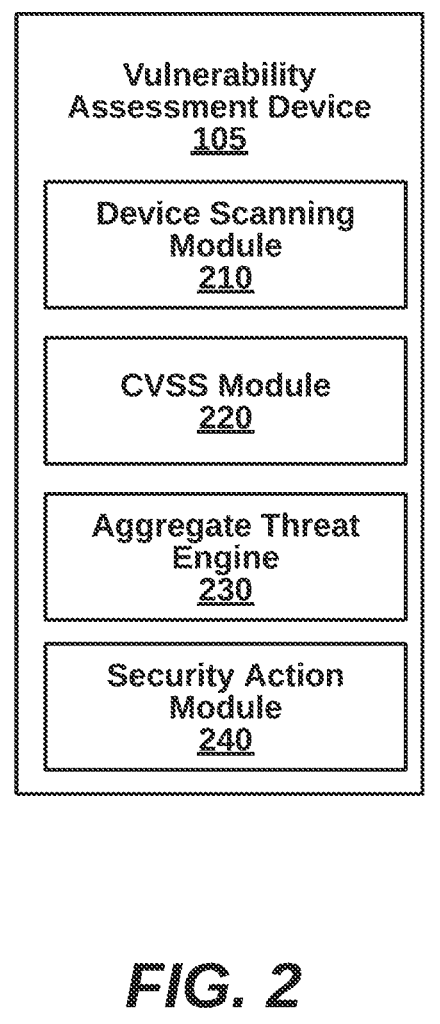

Vulnerability
Assessment Device
105

Device Scanning
Module
210

CVSS Module
220

Aggregate Threat
Engine
230

Security Action
Module
240

*FIG. 2*

$$Risk = \sum^{\#vulnerabilities} Probability \times Impact \qquad (1)$$

(PRIOR ART)

$$Weight = \frac{1}{\gamma} e^{-i/\gamma} \qquad (2)$$

$$b_j = \sum_{i=0}^{\#vulnerabilities} \frac{1}{\gamma} e^{-i/\gamma} c_{ij} \qquad (3)$$

$$SecurityRisk = log_{10} \sum_{j=0}^{9} b_j 10^j \qquad (4)$$

RISK EVALUATION FOR A VULNERABILITY ASSESSMENT SYSTEM ON A DATA COMMUNICATION NETWORK FROM A COLLECTION OF THREATS

FIELD OF THE INVENTION

The invention relates generally to computer networking, and more specifically, for evaluating risk for a vulnerability system on a data communication network from a collection of threats.

BACKGROUND

In cybersecurity, a vulnerability is a weakness in the system which can be exploited by attackers with malicious intent. One response from the industry over the last decade is adoption of the CVSS (Common Vulnerability Scoring System) to characterize the severities of software vulnerabilities.

In more detail, CVSS is a free and open standard attempting to assign a numeric score to any reported vulnerabilities based on factors like exploitability and impact, eventually offering a quantitative measure so users can compare and optimally deploy resources according to the threat. The score for each vulnerability ranges from 0 to 10, with 0 posing the least risk while 10 being the most severe. Base scores for a list of vulnerabilities are easily available in tabulated form, while effects from system environment or the evolution of time are also accounted for in forms of environmental or temporal metrics, which tend to vary for specific users and vulnerabilities.

Recently, more and more dev-ops are building applications based on containers. When it comes to container security, a plethora of vulnerabilities can be found after investing an image, the number of which ranges from a dozen to a hundred. While CVSS does offer a way to evaluate a single vulnerability, the risk posed by a collection of vulnerabilities has not been properly addressed.

Therefore, what is needed is a robust technique for evaluating risk for a vulnerability system on a data communication network from a collection of threats.

SUMMARY

These shortcomings are addressed by the present disclosure of methods, computer program products, and systems for evaluating risk for a vulnerability system on a data communication network from a collection of threats.

In one embodiment, a private network is scanned to identify devices, and profiling identified devices for vulnerabilities. A score is determined from a Common Vulnerability Scoring System (CVSS) database for each vulnerability individually that characterizes severity. The individual threat score increases with severity.

In another embodiment, a score is determined for a collection of vulnerabilities. Exponential tapering functions curb an influence of large numbers of low priority threats on the collection score. The collection threat score increases with severity of the collection of vulnerabilities.

In yet another embodiment, a security action is taken on the private network based on the collection score. Some security actions are preventative measures, and different measures can be taken with higher collection scores.

Advantageously, computer device performance is improved with safer network traffic. Likewise, network performance is improved for the same reason.

BRIEF DESCRIPTION OF THE DRAWINGS

In the following drawings, like reference numbers are used to refer to like elements. Although the following figures depict various examples of the invention, the invention is not limited to the examples depicted in the figures.

FIG. 2 is a more detailed block diagram illustrating a vulnerability assessment device of the system 110A of FIG. 1, according to an embodiment.

FIG. 3 is a list of equations for exponentially curbing contributions of a large number of low-risk vulnerabilities, according to an embodiment.

DETAILED DESCRIPTION

The description below provides methods, computer program products, and systems for evaluating risk for a vulnerability system on a data communication network from a collection of threats.

One of ordinary skill in the art will recognize many additional variations made possible by the succinct description of techniques below.

I. Vulnerability Assessment System for Aggregate Threat (FIGS. 1-3)

Figure 1:
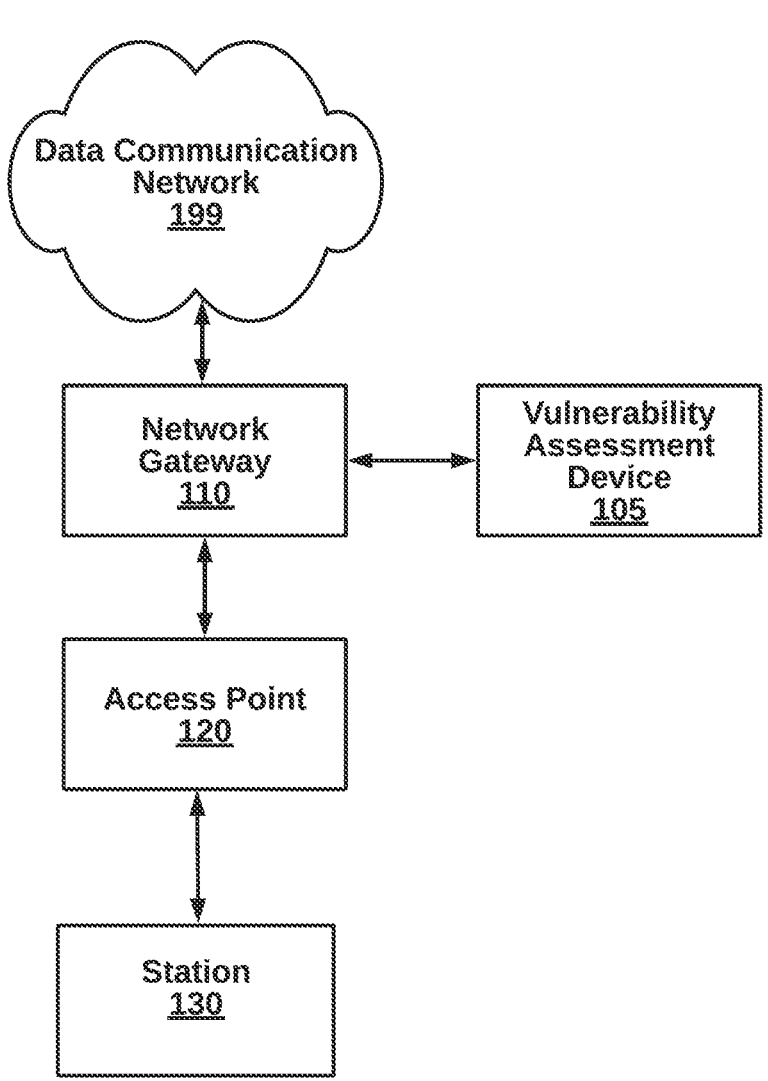
FIG. 1 is a block diagram illustrating a system for evaluating risk for a vulnerability system on a data communication network from a collection of threats, according to an embodiment.

FIG. 1 is a block diagram illustrating a system 100 for evaluating risk for a vulnerability system on a data communication network from a collection of threats, according to an embodiment. The system 100 includes a vulnerability assessment device 105, a gateway 110, an access point 120, and a station 130, coupled to a data communication network 199. Many other configurations are possible, for example, with additional network components such routers, switches, repeaters, firewalls, and the like. Also, there can be many more or fewer clients in FIG. 1. The system components can be implemented in computer devices with non-transitory source code, such as set forth below with reference to FIG. 6.

The components of the system 100 are coupled in communication over the data communication network. The components can be connected to the data communication system via hard wire (e.g., the vulnerability assessment device 105, the gateway device 110, the access point 120). The components can also be connected via wireless networking (e.g., the station 130). The data communication network 199 can be composed of any data communication network such as an SDWAN, an SDN (Software Defined Network), WAN, a LAN, WLAN, a cellular network (e.g., 3G, 4G, 5G or 6G), or a hybrid of different types of networks. Various data protocols can dictate format for the data packets. For example, Wi-Fi data packets can be formatted according to IEEE 802.11, IEEE 802, 11r, and the like. Components can use IPv4 or IPv6 address spaces.

The vulnerability assessment device 105 comprises hardware and/or software that scans and configures devices to prevent malicious intrusions based on a top-down view of a collection of threats. More specifically, exponential tapering functions curb an influence of large numbers of low priority threats on the collection score. In one example, equation (1) shows a prior art evaluation of risk to be calculated as a product of probability and impact. However, as described herein, equation (2) exponentially decreases the weights contributed by each additional instance of the same vulnerability (or vulnerability group). Next, equation (3) displays the total contribution from one binned group calculated by a weighted sum. Finally, equation (4) computes a total score of a collection of threats. In this embodiment, a collection score exponentially weights a sum of all of bins, with a bit logarithm conversion and normalization.

In some embodiments, the vulnerability assessment is a separate physical device. In other embodiments, the functionality can be incorporated within another device, such as the gateway device 110. In FIG. 1, the vulnerability assessment device 105 is shown as tightly integrated with the gateway device 110, with a dedicated communication channel or API enhanced communication. In other embodiments, daemons around the system 100 report back to a master process. Further embodiments of the vulnerability assessment device 105 are discussed below with reference to FIG. 2.

The gateway device 110 protects the private network from malicious traffic incoming from the data communication network, and can also restrict outgoing traffic based on network policies. Real-time processes can include intrusion prevention systems and firewalls affected by the vulnerability assessment system 110. For instance, a firewall rule can be enabled based on the vulnerability of a Linux operating system in context of a collection of threats.

The access point 120 is a network device, of the present embodiment, scanned by the vulnerability assessment system. Network traffic is received over Ethernet and transmitted downstream to stations connected over Wi-Fi, which leads to certain vulnerabilities. Upstream traffic from the stations through the access point 120 can lead to additional vulnerabilities.

The station 130 is another source of vulnerabilities on the private network. As the station 130 is mobile and moves between networks, malicious apps placed over other networks can be sprung while connected. One embodiment requires the station 130 to download certain software patches prior to connecting. Another embodiment places the station 130 into a quarantine network until compliant with network policies.

FIG. 2 is a more detailed block diagram illustrating the vulnerability assessment device 105 of the system 100 of FIG. 1, according to an embodiment. The vulnerability assessment device 105 includes a device scanning module 210, a Common Vulnerability Scoring System (CVSS) engine 220, an aggregate threat engine 23, and a security action module 240. The modules can be implemented in source code stored in non-transitory memory executed by a processor. Alternatively, the modules can be implemented in hardware with microcode. The modules can be singular or representative of functionality spread over multiple components. Many other variations are possible.

The device scanning module 210 can scan the private network to identify devices. The identified devices are then profiled for characteristics associated with vulnerabilities. For example, data packets from devices are parsed to determine a device type, an operating system type and version number, applications installed, connected devices, and the like. Data packets can also be targeted to devices and responses are analyzed for indications of characteristics. A list or table can be compiled as a result of scanning. In one case, a local daemon downloaded on devices gathers deeper profile information.

The CVSS engine 220 determines a score from a CVSS database for each vulnerability individually that characterizes severity. The CVSS database can provide an explicit measure for impact and an estimated measure for probability, in an embodiment. The estimated measure for probability can be based on an exploitability metric provided by the CVSS database. The individual threat score increases with severity. Quantitative scores for comparing different vulnerabilities of the CVSS database are not additive.

In more detail, a CVSS score can be between 0 and 10 representing severity of a vulnerability. The CVSS is composed of three metric groups, base, temporal and environmental, each consisting of a set of metrics. The base metric group includes exploitability metrics and impact metrics. The exploitability metrics of one CVSS database are attack vector, attack complexity, privileges required, user interaction and scope. The impact metrics can include confidentiality impact, integrity impact and availability impact.

The aggregate threat engine 230, in an embodiment, determines a score for a collection of vulnerabilities. Exponential tapering functions curb an influence of large numbers of low priority threats on the collection score. The collection threat score increases with severity of the collection of vulnerabilities.

The security action module 240 takes a security action based on the collection score. In one case, preventative measures are prioritized for higher collection scores. For example, software patches can be installed, firewall policies can be configured.

II. Methods of Vulnerability Assessment for Aggregate Threat (FIGS. 4-5)

Figure 4:
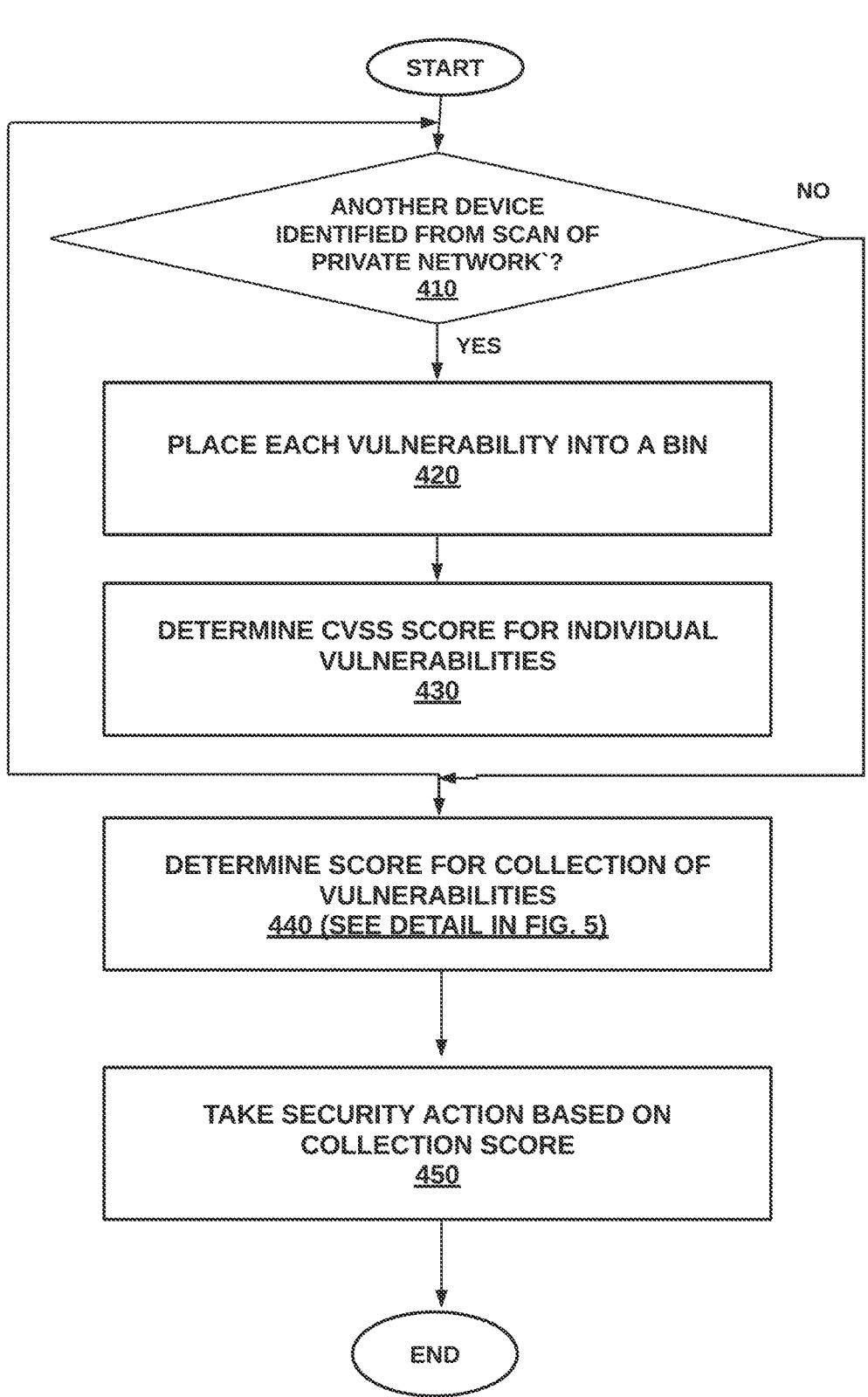
FIG. 4 is a high-level flow diagram illustrating a method for evaluating risk for a vulnerability system on a data communication network from a collection of threats n, according to one preferred embodiment.
Figure 5:
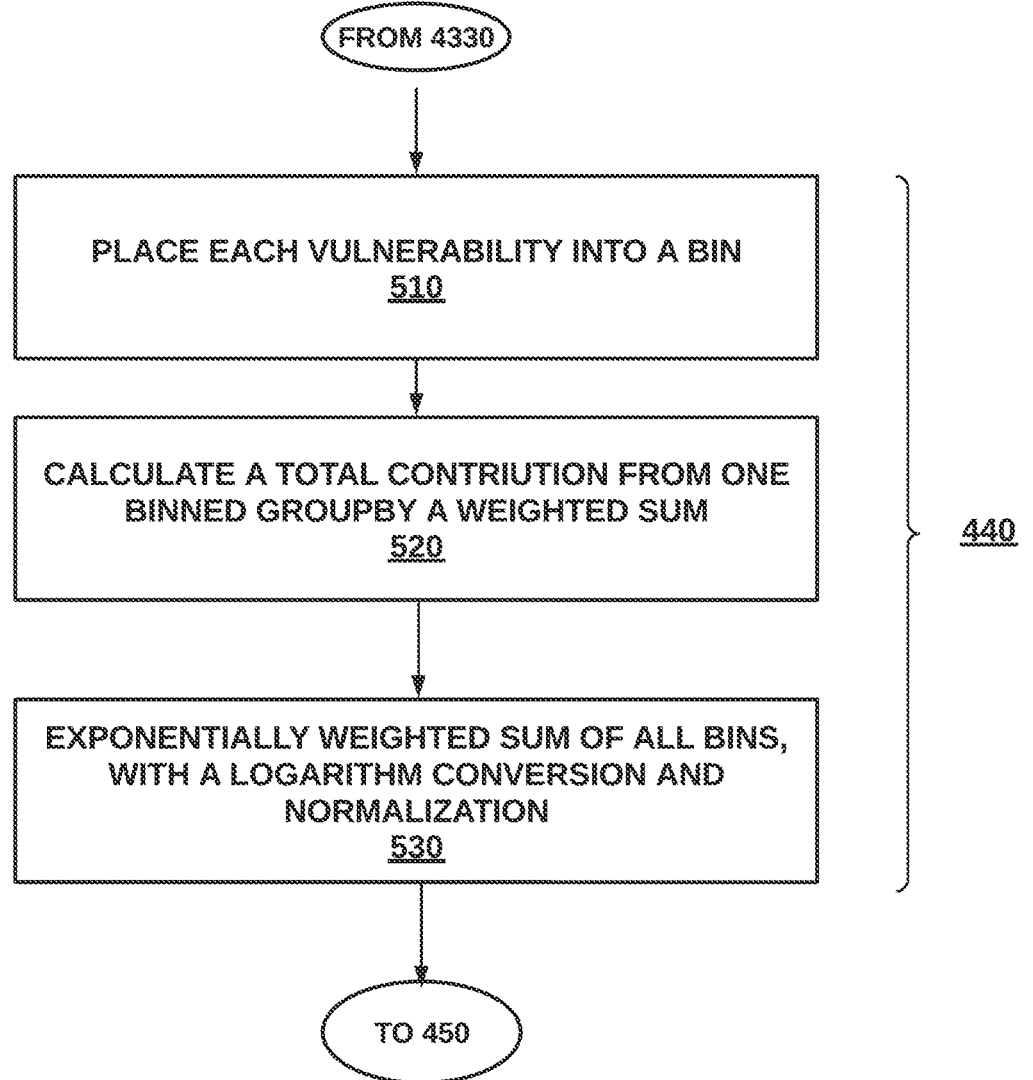
FIG. 5 is a more detailed flow diagram illustrating a step of exponentially curbing an influence of large numbers of low risk vulnerabilities, for the method of FIG. 4, according to one embodiment.

FIG. 4 is a high-level flow diagram illustrating a method for evaluating risk for a vulnerability assessment system on a data communication network from a collection of threats, according to one preferred embodiment. The method 400 can be implemented, for example, by the local network gateway device 110 of system 100. The steps are merely representative groupings of functionality, as there can be more or fewer steps, and the steps can be performed in different orders. Many other variations of the method 400 are possible.

At step 410, a private network is scanned to identify devices. At step 420, identified devices are then profiled for vulnerabilities.

At step 430, a score is determined from a CVSS database for each vulnerability individually that characterizes severity. The individual threat score increases with severity.

At step 440, a score for a collection of vulnerabilities is determined, with an influence of large numbers of low priority threats on the collection score are curbed with exponential tapering functions curb. The collection threat score increases with severity of the collection of vulnerabilities. One example is detailed further in FIG. 5.

At step 510 of FIG. 5, each vulnerability is placed into a bin and the bin for an individual vulnerability (or group of vulnerabilities) is weighted by a number of i-th, instances (see equation (2) in FIG. 3). The weights contributed to the eventual sum decrease exponentially. Since an exponential sequence is convergent, the sum of weights in any specific group converges to one. This ensures a large number of vulnerabilities (e.g., a thousand) will not contribute more significantly than a dozen more sever vulnerabilities.

At step 520, a total contribution from one binned group can be calculated by a weighted sum (see equation (3) in FIG. 3). $C_{ij}$ is the CVSS base score of the i-th vulnerability in the j-th bin, and $b_j$ is a measure of the total contribution of the j-th bin. $\lambda$ is a parameter indicating when to start curbing the contributions of a large number of vulnerabilities.

At step 530, a total score can be computed by an exponentially weighted sum of all bins, with a bit logarithm conversion and normalization (see equation (4) in FIG. 3).

Returning to FIG. 4, at step 450, a security action module to take a security action based on the collection score.

III. Generic Computing Environment (FIG. 6)

Figure 6:
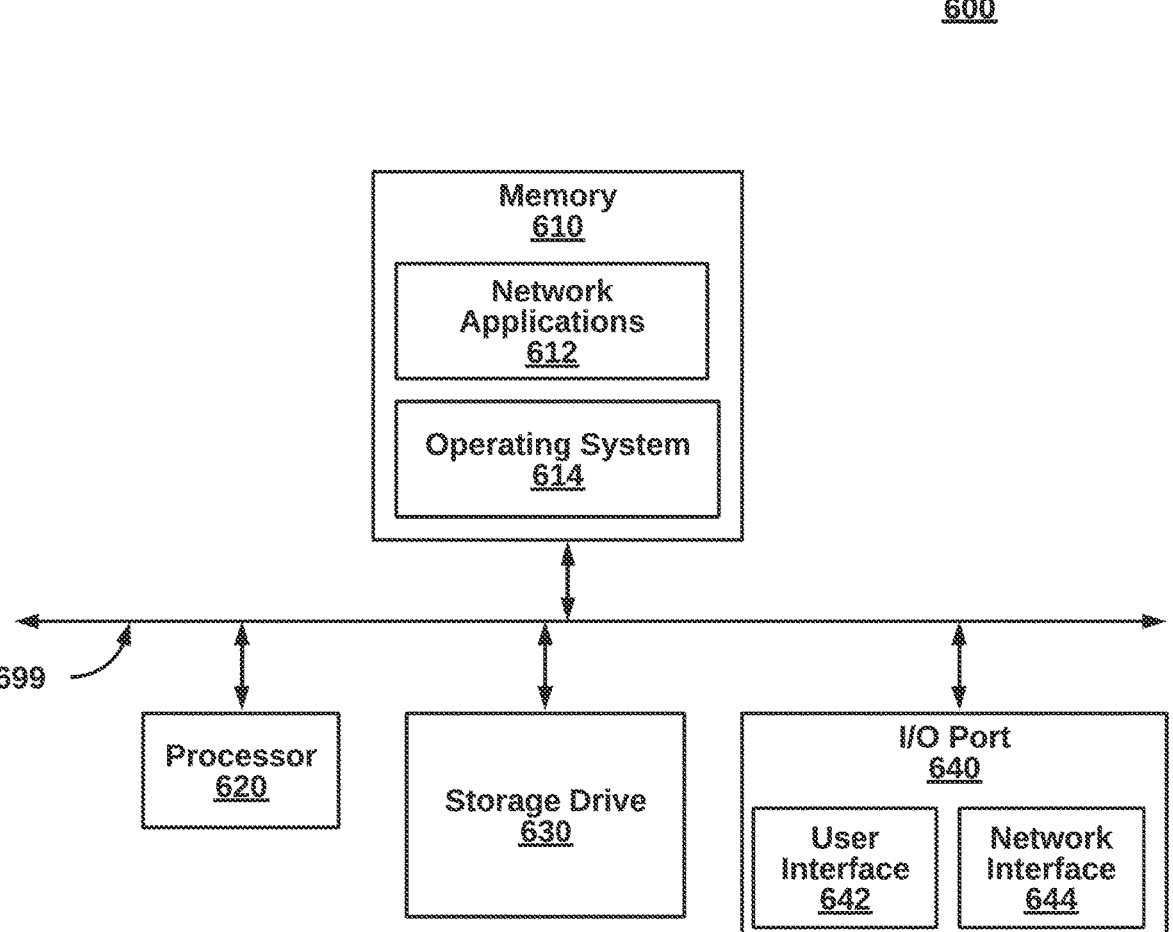
FIG. 6 is a high-level block diagram illustrating a computing device as an example hardware implementation of network devices herein, according to an embodiment.

FIG. 6 is a block diagram illustrating a computing device 600 capable of implementing components of the system, according to an embodiment. The computing device 600 of the present embodiment, includes a memory 610, a processor 620, a storage drive 630, and an I/O port 640. Each of the components is coupled for electronic communication via a bus 699. Communication can be digital and/or analog and use any suitable protocol. The computing device 600 can be any of components of the system 100 (e.g., the vulnerability assessment device 105, the network gateway device 110, the remote network gateway device 110B, the access point 120, the station 130, and the remote station 130B), other networking devices (e.g., an access point, a firewall device, a gateway, a router, or a wireless station), or a disconnected device.

Network applications 612 (e.g., vulnerability assessment processes) can be network browsers, daemons communicating with other network devices, network protocol software, and the like. An operating system 614 within the computing device 600 executes software, processes. Standard components of the real OS environment 614 include an API module, a process list, a hardware information module, a firmware information module, and a file system. The operating system 614 can be FORTIOS, one of the Microsoft Windows® family of operating systems (e.g., Windows 96, 98, Me, Windows NT, Windows 2000, Windows XP, Windows XP x64 Edition, Windows Vista, Windows CE, Windows Mobile, Windows 6 or Windows 8), Linux, HP-UX, UNIX, Sun OS, Solaris, Mac OS X, Alpha OS, AIX, IRIX32, IRIX64, or Android. Other operating systems may be used. Microsoft Windows is a trademark of Microsoft Corporation.

The storage drive 630 can be any non-volatile type of storage such as a magnetic disc, EEPROM (electronically erasable programmable read-only memory), Flash, or the like. The storage drive 630 stores code and data for applications.

The I/O port 640 further comprises a user interface 642 and a network interface 644. The user interface 642 can output to a display device and receive input from, for example, a keyboard. The network interface 644 (e.g., an RF antennae) connects to a medium such as Ethernet or Wi-Fi for data input and output. Many of the functionalities described herein can be implemented with computer software, computer hardware, or a combination.

Computer software products (e.g., non-transitory computer products storing source code) may be written in any of various suitable programming languages, such as C, C++, C#, Oracle® Java, Javascript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems). Some embodiments can be implemented with artificial intelligence.

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VOIP) support, Virtual Private Networking (VPN), IPsec, Secure Sockets Layer (SSL), anti-virus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTI-WIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A vulnerability assessment device, implemented at least partially in hardware, and coupled to a data communication network, for evaluating risk from a collection of threats from the data communication network to a private network, the vulnerability assessment device comprising:

a processor;

a network interface communicatively coupled to the processor and communicatively coupled to receive and transmit data packets over channels on the data communication network; and a memory communicatively coupled to the processor and storing:

a device scanning module to scan the private network to identify devices, and profiling the identified devices for vulnerabilities;

a Common Vulnerability Scoring System (CVSS) engine to determine a score from a CVSS database for each vulnerability individually that characterizes severity, wherein the individual threat score increases with severity;

an aggregate threat engine to determine a score for a collection of vulnerabilities, wherein exponential tapering functions curb an influence of large numbers of low priority threats on the collection score, and wherein the collection threat score increases with severity of the collection of vulnerabilities; and a security action module to take a security action based on the collection score.

2. The vulnerability assessment device of claim 1, wherein the aggregate threat engine calculates risk as a logarithmic summation of weighted impacts.

3. The vulnerability assessment device of claim 1, wherein each additional instance of an individual vulnerability has an exponentially decreasing contribution to the collection score.

4. The vulnerability assessment device of claim 1, wherein the collection score includes a bit logarithm conversion and normalization of individual vulnerability contributions to the collection score.

5. The vulnerability assessment device of claim 1, wherein the private network comprises at least one network gateway, at least one access point, and at least one station.

6. The vulnerability assessment device of claim 1, wherein the security action comprises at least one of: configuring a firewall, and configuring a network policy rule.

7. The vulnerability assessment device of claim 1, wherein the device scanning module parses data packets to determine characteristics of the identified devices, wherein the characteristics comprise: a device type, an operating system and version number, and applications installed.

8. The vulnerability assessment device of claim 1, wherein the device scanning module targets data packets at the devices and analyzes responses for indications of characteristics of the devices.

9. A method in a vulnerability assessment device implemented at least partially in hardware, and coupled to a data communication network, for evaluating risk from a collection of threats from the data communication network to a private network, the method comprising the steps of:

scanning the private network to identify devices;

profiling the identified devices for vulnerabilities;

determining a score from a Common Vulnerability Scoring System (CVSS) database for each vulnerability individually that characterizes severity, wherein the individual threat score increases with severity;

determining a score for a collection of vulnerabilities, wherein exponential tapering functions curb an influence of large numbers of low priority threats on the collection score, and wherein the collection threat score increases with severity of the collection of vulnerabilities; and taking a security action based on the collection score.

10. The method of claim 9, wherein the aggregate threat engine calculates risk as a product of probability and impact.

11. The method of claim 9, wherein each additional instance of an individual vulnerability has an exponentially decreasing contribution to the collection score.

12. The method of claim 9, wherein the collection score includes a bit logarithm conversion and normalization of individual vulnerability contributions to the collection score.

13. The method of claim 9, wherein the private network comprises at least one network gateway, at least one access point, and at least one station.

14. The method of claim 9, wherein the security action comprises at least one of: configuring a firewall, and configuring a network policy rule.

15. A method on a non-transitory computer-readable medium of a vulnerability assessment device implemented at least partially in hardware, and coupled to a data communication network, for evaluating risk from a collection of threats from the data communication network to a private network, the method comprising the steps of:

scanning the private network to identify devices;

profiling the identified devices for vulnerabilities;

determining a score from a Common Vulnerability Scoring System (CVSS) database for each vulnerability individually that characterizes severity, wherein the individual threat score increases with severity;

determining a score for a collection of vulnerabilities, wherein exponential tapering functions curb an influence of large numbers of low priority threats on the collection score, and wherein the collection threat score increases with severity of the collection of vulnerabilities; and taking a security action based on the collection score.

16. The method of claim 15, wherein the aggregate threat engine calculates risk as a product of probability and impact.

17. The method of claim 15, wherein each additional instance of an individual vulnerability has an exponentially decreasing contribution to the collection score.

18. The method of claim 15, wherein the collection score includes a bit logarithm conversion and normalization of individual vulnerability contributions to the collection score.

19. The method of claim 15, wherein the private network comprises at least one network gateway, at least one access point, and at least one station.

20. The method of claim 15, wherein the security action comprises at least one of: configuring a firewall, and configuring a network policy rule.

\* \* \* \* \*